(12) United States Patent
Zhang

(10) Patent No.: US 11,197,267 B2
(45) Date of Patent: Dec. 7, 2021

(54) COMMUNICATION METHOD, ACCESS NETWORK DEVICE, AND TERMINAL

(71) Applicant: Huawei Technologies Co., Ltd., Shenzhen (CN)

(72) Inventor: Hongping Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 35 days.

(21) Appl. No.: 16/859,141

(22) Filed: Apr. 27, 2020

(65) Prior Publication Data
US 2020/0260409 A1   Aug. 13, 2020

Related U.S. Application Data

(63) Continuation of application No. 16/502,522, filed on Jul. 3, 2019, now Pat. No. 10,652,855, which is a (Continued)

(30) Foreign Application Priority Data

Jan. 5, 2017   (CN) .......................... 201710007022.4

(51) Int. Cl.
*H04W 36/08* (2009.01)
*H04W 68/02* (2009.01)
*H04W 36/00* (2009.01)

(52) U.S. Cl.
CPC ....... *H04W 68/02* (2013.01); *H04W 36/0033* (2013.01); *H04W 36/08* (2013.01)

(58) Field of Classification Search
CPC . H04W 68/02; H04W 36/0033; H04W 36/08; H04W 68/08; H04W 76/27;
(Continued)

(56) References Cited

U.S. PATENT DOCUMENTS

2014/0018085 A1* 1/2014 Young ............... H04W 52/0235
455/450
2014/0179325 A1   6/2014 Xu et al.
(Continued)

FOREIGN PATENT DOCUMENTS

CN      101022648 A    8/2007
CN      102291820 A   12/2011
(Continued)

OTHER PUBLICATIONS

"Procedures for Moving within RAN Based Paging Area," Source: Huawei, China Telecom, Agenda Item: 21.1, Document for: Approval, 3GPP TSG-RAN3 Meeting #93, R3-162156, Oct. 10-14, 2016, 3 pages.
(Continued)

*Primary Examiner* — Chuong A Ngo
(74) *Attorney, Agent, or Firm* — Slater Matsil, LLP

(57) ABSTRACT

A communication method, an access network device, and a terminal, the method comprising sending, by a first access network device, in a cell of the first access network device and corresponding to a radio network area of a terminal in a radio resource control (RRC) inactive state, and in response to the terminal in the RRC inactive state needing to be paged, a first paging message paging the terminal and sending, by the first access network device to a second access network device, a paging request message requesting to page the terminal, where the second access network device is an access network device other than the first access network device, and where the second access network device corresponds to the radio network area.

20 Claims, 6 Drawing Sheets

Related U.S. Application Data continuation of application No. PCT/CN2017/118921, filed on Dec. 27, 2017.

(58) Field of Classification Search
CPC ..... H04W 36/00; H04W 88/02; H04W 88/08; H04W 36/14; H04W 12/04; H04W 12/06
See application file for complete search history.

(56) References Cited

U.S. PATENT DOCUMENTS

| | | | |
|---|---|---|---|
| 2015/0080034 A1 | 3/2015 | Xi et al. | |
| 2016/0205660 A1 | 7/2016 | Ryu et al. | |
| 2016/0295521 A1* | 10/2016 | Grayson | H04W 52/283 |
| 2019/0082490 A1 | 3/2019 | Zhang et al. | |
| 2019/0274074 A1 | 9/2019 | Lee et al. | |
| 2019/0349883 A1* | 11/2019 | Fujishiro | H04W 76/11 |

FOREIGN PATENT DOCUMENTS

| | | |
|---|---|---|
| CN | 102340754 A | 2/2012 |
| CN | 102835162 A | 12/2012 |
| CN | 103906152 A | 7/2014 |
| CN | 105898894 A | 8/2016 |
| EP | 2852244 A1 | 3/2015 |
| RU | 2541173 C2 | 2/2015 |

OTHER PUBLICATIONS

"RAN Initiated Paging," Source: Huawei, Agenda Item: 21, Document for: Discussion, 3GPP TSG-RAN3 Meeting #93, R3-161720, Gothenburg, Sweden, Aug. 22-26, 2016, 4 pages.

"Discussion on Open Issues for Lightly Connected UE," Agenda item: 21.2, Source: LG Electronics Inc., Document for: Discussion, 3GPP TSG-RAN WG3 Meeting #94, R3-162695, Reno, Nevada, USA, Nov. 14-18, 2016, 3 pages.

"Discussion on Open Issues for LC," Source: CATT, Agenda Item: 21.2, Document for: Discussion and Decision, 3GPP TSG RAN WG3 Meeting #94, R3-162702, Reno, USA, Nov. 14-18, 2016, 6 pages.

"Discussion on RAN Initiated Paging," Source: Samsung, Agenda item: 21.1, Document for: Discussion and approval, 3GPP TSG-RAN WG3 #94, R3-162752, Reno, Nevada, U.S.A., Nov. 14-18, 2016, 4 pages.

"RAN Initiated Paging Solution," Source: Huawei, China Telecom, Agenda Item: 21, Document for: Discussion, 3GPP TSG-RAN3 Meeting #92, R3-161167, Nanjing, China, May 23-27, 2016, 5 pages.

"3rd Generation Partnership Project; Technical Specification Group Services and System Aspects; Study on Architecture for Next Generation System (Release 14)," 3GPP TR 23.799 V14.0.0, Dec. 2016, 522 pages.

"RAN2 Impact of Context Fetch in Light Connection," Source: Huawei, HiSilicon, Agenda Item: 8.9.2, Document for: Discussion, 3GPP TSG-RAN2 Meeting #95, R2-165249, Aug. 22-26, 2016, 2 pages.

"Discussion on RAN notification area for the new RRC state," Agenda item: 9.2.2.1, Source: Intel Corporation, Document for: Discussion and decision, 3GPP TSG RAN WG2 Meeting #96, R2-168524, Reno, USA, Nov. 14-18, 2016, 3 pages.

"Way Forward on Light Connection WI," Source: Huawei (Rapporteur), Agenda Item: 21, Document for: Approval, 3GPP TSG-RAN3 Meeting #94, R3-163238, Reno, US, Nov. 14-18, 2016, 4 pages.

"3rd Generation Partnership Project; Technical Specification Group Radio Access Network; Evolved Universal Terrestrial Radio Access (E-UTRA); User Equipment (UE) procedures in Idle Mode (Release 14)," 3GPP TS 36.304 V14.1.0, Dec. 2016, 46 pages.

"Signalling Impact Analysis of RAN Based Paging," Source: NTT Docomo, Inc., Document for: Discussion, Agenda Item: 8.9.2, 3GPP TSG-RAN WG2#95bis, R2-167146, Oct. 10-14, 2016, 4 pages.

"CN Assisted Paging fall-back: How to make it work?," Agenda Item: 21.1, Source: NEC, Document for: Approval, 3GPP TSG-RAN WG3 Meeting #94, R3-162895, Nov. 14-18, 2015, 4 pages.

* cited by examiner

COMMUNICATION METHOD, ACCESS NETWORK DEVICE, AND TERMINAL

CROSS-REFERENCE TO RELATED APPLICATIONS

This application is a continuation of U.S. patent application Ser. No. 16/502,522, filed on Jul. 3, 2019, which is a continuation of International Application No. PCT/CN2017/118921, filed on Dec. 27, 2017, which claims priority to Chinese Patent Application No. 201710007022.4, filed on Jan. 5, 2017. All of the afore-mentioned patent applications are hereby incorporated by reference in their entireties.

TECHNICAL FIELD

Embodiments of this application relate to the communications field, and more specifically, to a communication method, an access network device, and a terminal.

BACKGROUND

To meet growing traffic requirements and services of various requirements, the $3^{rd}$ Generation Partnership Project (3GPP) standardization organization is currently developing standards for a next-generation mobile communications system. Inactive state is a newly introduced radio resource control (RRC) state, which is referred to as "RRC inactive state" or "inactive state" below. As in an idle state, in the inactive state, an RRC connection between a terminal and a network is disconnected, and the terminal does not need to receive downlink data, so as to achieve the same power-saving effect as in the idle state. Unlike in the idle state, in the inactive state, when a terminal needs to enter a connected state, for example, the terminal has uplink data that needs to be sent, or a network pages the terminal to enter the connected state, the terminal can restore the connected state based on a saved context of the terminal. On a network side, an access network device requested by the terminal requests a context of the terminal from an original serving access network device of the terminal, so that the access network device can also obtain the context of the terminal, and restore a connection to the terminal based on the context.

The next-generation mobile communications system has a higher delay requirement, and how to reduce time for a terminal to restore from an RRC inactive state to an RRC connected state becomes a technical problem that needs to be urgently resolved.

SUMMARY

Embodiments of this application provide a communication method, an access network device, and a terminal, so as to reduce time for the terminal to restore from an RRC inactive state to an RRC connected state.

According to a first aspect, a communication method is provided, including determining, by a first access network device, that a terminal needs to enter a radio resource control RRC inactive state, where the first access network device is a serving access network device of the terminal, sending, by the first access network device, a first message to a second access network device, where the first message includes a context of the terminal, and sending, by the first access network device, a second message to the terminal, where the second message is used to instruct the terminal to enter the RRC inactive state.

In this embodiment of this application, when determining that the terminal needs to enter the RRC inactive state, the first access network device sends the context of the terminal to the second access network device. In this way, when the terminal requests, of the second access network device, to be restored to the RRC inactive state, the second access network device no longer needs to obtain the context of the terminal from the first access network device, so that time for restoring the terminal from the RRC inactive state to the RRC connected state can be reduced, and then a data transmission delay can be reduced.

In some possible implementations, the second message includes information about a radio network area of the terminal in the RRC inactive state.

In some possible implementations, the radio network area is used not to notify the network when the terminal reselects a cell in the radio network area in RRC inactive state, or the radio network area is used to notify the network when the terminal reselects a cell outside the radio network area.

In some possible implementations, the radio network area includes a first cell set.

The method further includes receiving, by the first access network device, a first response message that is of the first message and that is sent by the second access network device, where the first response message includes information about a second cell set, and the second cell set is a set including one or more cells that are of the second access network device, and determining, by the first access network device, the first cell set based on the second cell set, where the first cell set includes the second cell set.

In some possible implementations, the radio network area includes a first access network device set.

The method further includes receiving, by the first access network device, a second response message that is of the first message and that is sent by the second access network device, where the second response message indicates that the second access network device accepts or refuses to join the radio network area, and determining, by the first access network device, the first access network device set based on the second response message, where the first access network device set includes at least one second access network device that accepts to join the radio network area.

A cell included in the determined radio network area is a cell accepted by the second access network device. This can reduce a probability that the terminal fails to be restored.

In some possible implementations, the context of the terminal includes key information of communication between the terminal and the second access network device, and the key information includes a key generated based on an identifier of the second access network device, or a key generated based on a random value, or one or more keys generated based on a cell identity or cell identities of the one or more cells of the second access network device.

In some possible implementations, the first message further includes a third cell set, and the third cell set is a set of one or more cells that are of the second access network device and that the first access network device requests to be accepted.

In some possible implementations, the first message further includes first validity period information, and the first validity period information indicates a validity period of the context of the terminal.

In some possible implementations, the first message further includes an authentication code generated based on a key between the terminal and the first access network device, where the authentication code is used by the second access network device to identify the terminal or authenticate the terminal when the terminal accesses the second access network device.

In some possible implementations, the second message further includes a signal strength threshold, and the signal strength threshold is used by the terminal to perform cell replacement in the radio network area when a signal strength of a cell in the radio network area is greater than or not less than the signal strength threshold.

In some possible implementations, the signal strength threshold may be a uniform threshold, or may be a cell-level threshold, for example, a threshold may be configured for some cells.

In some possible implementations, the second message further includes second validity period information, and the second validity period information indicates a validity period during which the terminal can be restored to an RRC connected state.

In some possible implementations, after the validity period, the terminal can no longer be restored, or needs to delete the saved context and enter an idle state. When the terminal needs to enter a connected state, the terminal can initiate an initial access and enter the connected state in a manner of initiating the initial access.

In some possible implementations, the second message further includes a random value used for generating a key.

In some possible implementations, the first message may further include a list of all second access network devices.

In some possible implementations, an access network device may include a central unit (CU) and a distributed unit (DU). A message, such as RRC signaling, sent by the access network device to the terminal may be generated by the CU, and is sent to the terminal through the DU, or is sent to the terminal directly after being generated by the DU.

In some possible implementations, the method further includes receiving, by the first access network device, a notification message indicating that the terminal enters a connected state, and releasing, by the first access network device, the context of the terminal.

In some possible implementations, the method further includes sending, by the first access network device, a notification for releasing the context of the terminal, to an access network device other than the first access network device in access network devices corresponding to the radio network area of the terminal in the RRC inactive state.

In some possible implementations, the method further includes when the terminal in the RRC inactive state needs to be paged, sending, by the first access network device in a cell that is of the first access network device and that is corresponding to the radio network area of the terminal in the RRC inactive state, a first paging message for paging the terminal, and sending, by the first access network device to a third access network device, a paging request message for requesting to page the terminal, where the third access network device is an access network device other than the first access network device in access network devices corresponding to the radio network area.

In some possible implementations, the paging request message includes information about a fourth cell set, and is used to instruct the third access network device to send, in all cells in the fourth cell set, a second paging message for paging the terminal, where the fourth cell set is a set of cells that are included in the radio network area and that are of the third access network device.

In some possible implementations, the method further includes sending, by the first access network device, a third message to a core network device if the first access network device does not receive, within a predetermined period of time, a paging response sent by the terminal or a notification that indicates that the terminal enters a connected state and that is sent by the third access network device, where the third message is used to request the core network device to release a connection between an access network of the terminal and a core network.

By releasing the connection between the access network of the terminal and the core network in the foregoing manner, the paging for paging the terminal may be triggered by the core network in a wider range, so that the terminal can be paged easily.

In some possible implementations, the method further includes receiving, by the first access network device, a response message that is of the third message and that is sent by the core network device, where the response message of the third message indicates that the connection between the access network of the terminal and the core network has been released, releasing, by the first access network device, the context of the terminal, and sending, by the first access network device, to the third access network device, a notification for releasing the context of the terminal.

In some possible implementations, each access network device may set a timer based on a validity period of the context of the terminal. Before the timer expires, if no restoration request of the terminal is received, or no notification that indicates that the terminal enters the connected state or that is used for releasing the context of the terminal, that is sent by the another access network device is received, or no notification, the context of the terminal is released when the timer expires.

Releasing the context of the terminal timely can reduce a load on an access network device.

According to a second aspect, a communication method is provided, including receiving, by a second access network device, a first message sent by a first access network device, where the first message includes a context of a terminal, and the first access network device is a serving access network device of the terminal, receiving, by the second access network device, a fourth message sent by the terminal, where the fourth message is used to request restoration from a radio resource control RRC inactive state to an RRC connected state, and restoring, by the second access network device, the terminal from the radio resource control RRC inactive state to the RRC connected state based on the context of the terminal.

In this embodiment of this application, the second access network device obtains the context of the terminal from the first access network device in advance. In this way, when the terminal requests, of the second access network device, to be restored to the RRC inactive state, the second access network device no longer needs to obtain the context of the terminal from the first access network device, so that time for restoring the terminal from the RRC inactive state to the RRC connected state can be reduced, and then a data transmission delay can be reduced.

In some possible implementations, the method further includes determining, by the second access network device, a second cell set, where the second cell set is a set of cells that are accepted by the second access network device, that are corresponding to a radio network area of the terminal in the RRC inactive state, and that are of the second access network device, and sending, by the second access network device, a first response message of the first message to the first access network device, where the first response message includes the second cell set.

In some possible implementations, the method further includes sending, by the second access network device, to the first access network device, a notification that indicates that the terminal enters a connected state.

In some possible implementations, the method further includes sending, by the second access network device, a notification for releasing the context of the terminal, to an access network device other than the second access network device in access network devices corresponding to the radio network area of the terminal in the RRC inactive state.

In some possible implementations, before the receiving, by the second access network device, a fourth message sent by the terminal, the method further includes receiving, by the second access network device, a paging request message that is sent by the first access network device and that is used to request to page the terminal, and sending, by the second access network device based on the paging request message, a second paging message for paging the terminal.

In some possible implementations, the paging request message includes information about a cell that is of the second access network device and that is corresponding to the radio network area of the terminal in the RRC inactive state.

In some possible implementations, the sending, by the second access network device based on the paging request message, a second paging message for paging the terminal includes sending, by the second access network device, the second paging message in a cell that is of the second access network device and that is corresponding to the radio network area of the terminal in the RRC inactive state.

Sending a paging message only in a cell that is of the second access network device and that is corresponding to the radio network area can implement more accurate paging and save air interface resources.

According to a third aspect, a communication method is provided, including receiving, by a terminal, a second message sent by a first access network device, where the second message is used to instruct the terminal to enter a radio resource control RRC inactive state, the second message includes a radio network area of the terminal in the RRC inactive state, the first access network device is a serving access network device of the terminal, the radio network area includes a second access network device or a cell of the second access network device, the second access network device is an access network device that receives a context of the terminal, and the context of the terminal is used by the terminal to restore from the RRC inactive state to an RRC connected state entering, by the terminal, the RRC inactive state from the RRC connected state based on the second message.

In some possible implementations, the second message further includes a signal strength threshold.

The method further includes when a signal strength of a cell in the radio network area is greater than or not less than the signal strength threshold, performing, by the terminal, cell replacement in the radio network area.

In some possible implementations, the second message further includes second validity period information, and the second validity period information indicates a validity period during which the terminal can be restored to an RRC connected state.

In some possible implementations, after the validity period, the terminal can initiate initial access when the terminal needs to enter the connected state, so as to enter the connected state in an initial access manner.

In some possible implementations, the second message further includes a random value used for generating a key.

In some possible implementations, the entering, by the terminal, the RRC inactive state from the RRC connected state based on the second message includes when the terminal enters the RRC inactive state, remaining, by the terminal, in a cell in which the terminal is located when the terminal is in the original RRC connected state.

In some possible implementations, the method further includes sending, by the terminal, a fourth message to the second access network device, where the fourth message is used to request restoration from an RRC inactive state to an RRC connected state, and restoring, by the terminal based on the context of the terminal, from the RRC inactive state to the RRC connected state in a cell of the second access network device.

According to a fourth aspect, an access network device is provided, including modules that perform the method according to any one of the first aspect or the possible implementations of the first aspect.

According to a fifth aspect, an access network device is provided, including modules that perform the method according to any one of the second aspect or the possible implementations of the second aspect.

According to a sixth aspect, a terminal is provided, including modules that perform the method according to any one of the third aspect or the possible implementations of the third aspect.

According to a seventh aspect, an access network device is provided. The access network device includes a processor, a memory, and a communications interface. The processor is connected to the memory and the communications interface. The memory is configured to store an instruction, the processor is configured to execute the instruction, and the communications interface is configured to communicate with another network element under control of the processor. When the processor executes the instruction stored in the memory, the execution enables the processor to perform the method according to any one of the first aspect or the possible implementations of the first aspect, or according to any one of the second aspect or the possible implementations of the second aspect.

According to an eighth aspect, a terminal is provided. The terminal device includes a processor, a memory, and a communications interface. The processor is connected to the memory and the communications interface. The memory is configured to store an instruction, the processor is configured to execute the instruction, and the communications interface is configured to communicate with another network element under control of the processor. When the processor executes the instruction stored in the memory, the execution enables the processor to perform the method according to any one of the third aspect or the possible implementations of the third aspect.

According to a ninth aspect, a computer readable medium is provided, configured to store a computer program, where the computer program includes an instruction used to perform the method according to any one of the first aspect or the possible implementations of the first aspect.

According to a tenth aspect, a computer readable medium is provided, configured to store a computer program, where the computer program includes an instruction used to perform the method according to any one of the second aspect or the possible implementations of the second aspect.

According to an eleventh aspect, a computer readable medium is provided, configured to store a computer program, where the computer program includes an instruction used to perform the method according to any one of the third aspect or the possible implementations of the third aspect.

DETAILED DESCRIPTION OF ILLUSTRATIVE EMBODIMENTS

The following describes technical solutions of embodiments in this application with reference to accompanying drawings.

Figure 1:
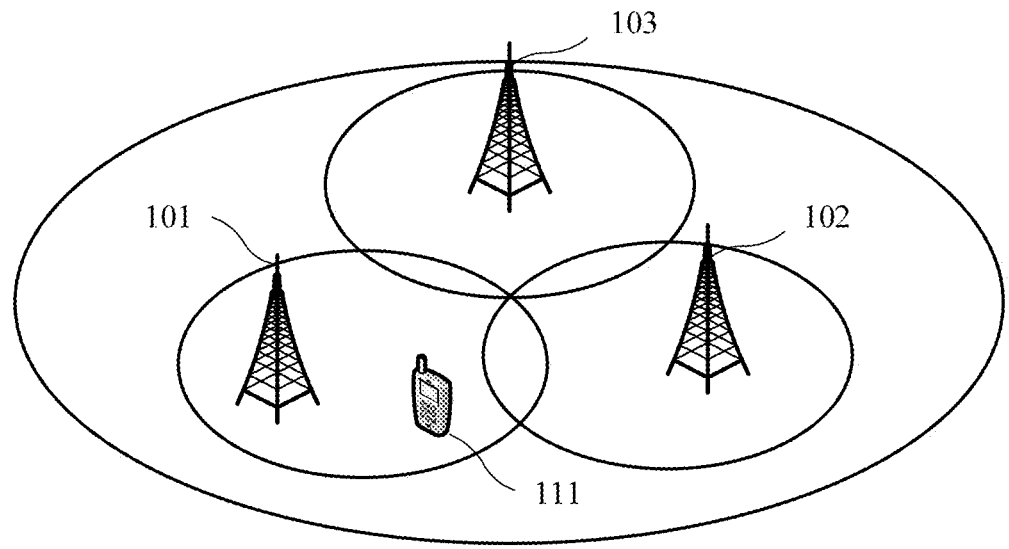
FIG. 1 is a schematic diagram of a network applied in an embodiment of this application.

FIG. 1 is a schematic diagram of a network applied in an embodiment of this application. As shown in FIG. 1, the network may include a plurality of access network devices, such as an access network device 101, an access network device 102, and an access network device 103. A current serving access network device of a terminal 111 is the access network device 101. The access network device 101 may configure, for the terminal 111, a radio network area of the terminal 111 in an RRC inactive state. The radio network area may be referred to as a radio access network (RAN) based notification area (RNA). The access network device 101 may deliver information about the radio network area to the terminal 111 by using dedicated signaling. The radio network area may include one or more cells. The radio network area does not notify the network when the terminal in reselects a cell in the radio network area in the RRC inactive state. In other words, the radio network area notifies the network when the terminal in reselects a cell outside the radio network area. Therefore, when the terminal in entering the RRC inactive state needs to be paged, the terminal 111 may be paged in a cell in the radio network area.

It should be understood that FIG. 1 is described by using only one terminal as an example, but this embodiment of this application is not limited thereto.

In this specification, the embodiments are described with reference to a terminal. The terminal may also be referred to as a terminal device, user equipment (UE), an access terminal, a subscriber unit, a subscriber station, a mobile station, a mobile console, a remote station, a remote terminal, a mobile device, a user terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future $5^{th}$ generation (5G) network, or a terminal device in a future evolved public land mobile network (PLMN), or the like.

In this specification, the embodiments are described with reference to an access network device. The Access network device may also refer to a network device. The network device may be a device configured to communicate with a terminal device. The network device may be a base transceiver station (BTS) in Global System for Mobile Communications (GSM) or Code-division multiple access (CDMA), may be a NodeB (NB) in a Wide Band Code Division Multiple Access (WCDMA) system, may be an evolved NodeB (eNB, or eNodeB) in an long term evolution (LTE) system, or may be a wireless controller in a Cloud Radio Access Network (CRAN) scenario, or the network device may be a relay station, an access point, an in-vehicle device, a wearable device, a network device in a future 5G network, or a network device in a future evolved public land mobile network (PLMN).

In this embodiment of this application, to reduce time for restoring the terminal from the RRC inactive state to an RRC connected state, a serving access network device of the terminal sends a context of the terminal to another access network device in advance. In this way, the terminal may quickly restore from the RRC inactive state to the RRC connected state of the another access network device, thereby further reducing a delay and saving signaling overheads.

Figure 2:
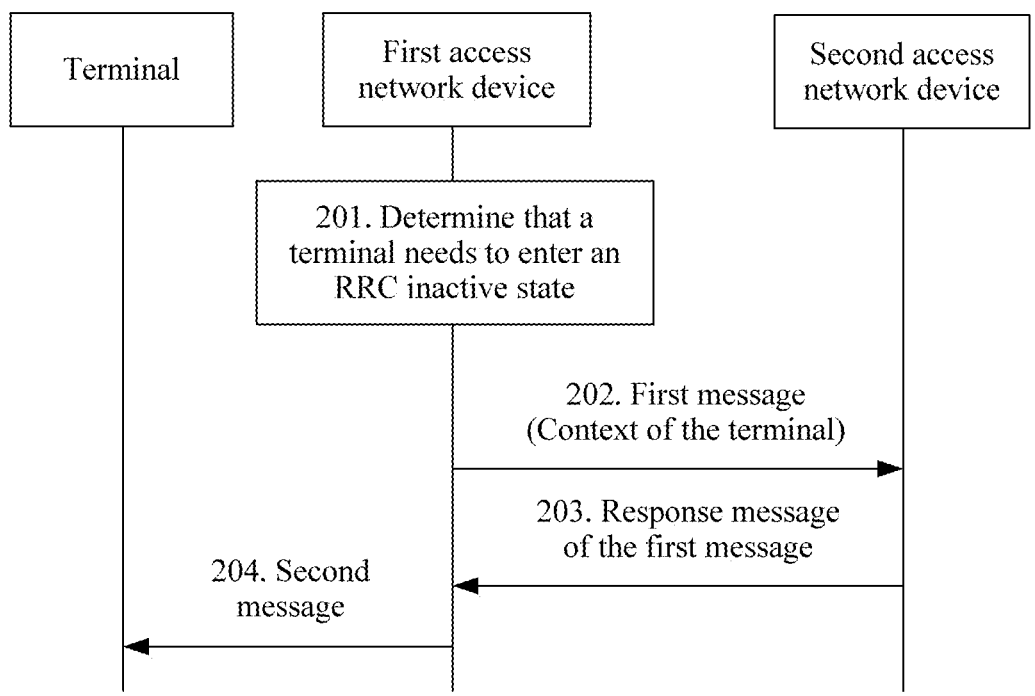
FIG. 2 is a schematic flowchart of a communication method according to an embodiment of this application.

FIG. 2 is a schematic flowchart of a communication method according to an embodiment of this application. In FIG. 2, a first access network device is a serving access network device of a terminal, and a second access network device is another access network device. For example, the second access network device may be an adjacent access network device of the first access network device. The first access network device, the second access network device, and the terminal in FIG. 2 may be respectively the access network device 101, the access network device 102 or 103, and the terminal 111 in FIG. 1.

201. A first access network device determines that a terminal needs to enter an RRC inactive state.

Specifically, the first access network device may determine, based on a service status of the terminal and the like, to enable the terminal to enter the RRC inactive state from an RRC connected state. For example, if it is detected that the terminal transmits no service data over a period of time, for example, transmits no uplink and downlink data, the terminal can be allowed to enter the RRC inactive state from the RRC connected state, thereby achieving power savings. It may be understood that, in this embodiment of this application, no limitation is imposed on when the first access network device enables the terminal to enter the RRC inactive state.

202. The first access network device sends a first message to a second access network device, where the first message includes a context of the terminal.

The context of the terminal is used to restore the terminal from the RRC inactive state to the RRC connected state.

The first access network device sends the context of the terminal to the second access network device in advance. In this way, if subsequently, the terminal requests, of the second access network device, to be restored to the RRC connected state, the second access network device may quickly restore the terminal from the RRC inactive state to the RRC connected state based on the context of the terminal that is obtained in advance.

It should be noted herein that the first access network device may send the first message to a plurality of adjacent access network devices. The second access network device herein is merely a general name, and is not limited to one access network device.

The context of the terminal includes, for example, a terminal capability, an application protocol identifier, a serving access network device identifier, authentication information, a negotiated security algorithm, a generated key, created connection information, and bearer information.

Optionally, in an embodiment of this application, the context of the terminal may include key information of communication between the terminal and the second access network device, and the key information includes a key generated based on an identifier of the second access network device, or a key generated based on a random value, or one or more keys generated based on a cell identity or cell identities of the one or more cells of the second access network device.

Specifically, the key information includes a new key for the terminal. The new key can be derived by the first access network device based on an initial key and newly added information. For example, the initial key may be a key between the terminal and the first access network device, or may be another basic key, such as a next hop (NH) derived based on a next hop chaining count (NCC). The newly added information may include the identifier of the second access network device, the random value, or the cell identity of the cell of the second access network device. If the new key is derived based on the cell identity, each of the plurality of cells of the second access network device corresponds to one key, or if the new key is derived based on, for example, the random value, or the identifier of the second access network device, the plurality of cells of the second access network device only need to carry one key.

Optionally, the first access network device may first determine a candidate cell list of a radio network area of the terminal in the RRC inactive state, and then send the first message to an access network device (that is, the second access network device) in which a cell in the cell list is located. Optionally, the first message may further include information about one or more cells of the second access network device, for example, a cell identity, and the first access network device requests the second access network device to accept the one or more cells as cells in the radio network area. That is, the first message may further include information about one cell set (represented as a third cell set), where the third cell set is a set of one or more cells that are of the second access network device and that the first access network device requests to be accepted.

Optionally, the first access network device may first determine an access network device list, and then send the first message to an access network device (that is, the second access network device) in the access network device list.

Optionally, if the first message does not include the information about the third cell set, it indicates that all cells of the second access network device are requested.

Optionally, the first access network device may determine the foregoing cell list or the access network device list based on information such as network deployment, a network status, or an activity status of the terminal. However, this is not limited in this embodiment of this application.

Optionally, the first message may further include a list of all second access network devices. In this way, after the terminal subsequently initiates a restoration procedure on an access network device, the access network device may instruct the access network device in the list to release the context of the terminal.

Optionally, the first message may further include first validity period information, and the first validity period information indicates a validity period of the context of the terminal.

Specifically, if the second access network device does not receive a restoration request of the terminal within the validity period, the second access network device releases the context of the terminal. For example, the second access network device may start a timer whose duration is the validity period of the terminal. Optionally, if the second access network device receives, within the validity period, an updated first message that is sent by the first access network device and that is specific to the terminal, the second access network device restarts the timer.

Optionally, the first message may further include an authentication code generated based on a key between the terminal and the first access network device, where the authentication code is used by the second access network device to identify the terminal or authenticate the terminal when the terminal accesses the second access network device.

Optionally, if the first message does not include an authentication code, when the terminal initiates the restoration procedure on the second access network device, the second access network device may generate an authentication code based on a new key (for example, a key between the terminal and the second access network device) to authenticate the terminal.

Optionally, after the second access network device receives the first message sent by the first access network device, the second access network device may determine a second cell set, where the second cell set is a set of cells that are accepted by the second access network device, that are corresponding to the radio network area of the terminal in the RRC inactive state, and that are of the second access network device, and send a first response message of the first message to the first access network device, where the first response message includes information about the second cell set.

The second cell set is a set of cells that are accepted by the second access network device and that can be added to the radio network area. For example, the second access network device may determine, based on a status of the second access network device, such as a load status, whether the terminal is allowed to restore, or determine which cells can be restored. Optionally, if the first message includes the information about the third cell set, the second access network device may determine, in the third cell set, the cell in the second cell set, or if the first message does not include the information about the third cell set, the second access network device may determine the cell in the second cell set from all cells of the second access network device. After the second access network device determines the second cell set, the information about the second cell set may be included in a response message sent to the first access network device. Optionally, if no cell of the second access network device can join the radio network area, the response message sent by the second access network device to the first access network device is a reject message.

Optionally, the second access network device may also send a second response message of the first message to the first access network device, where the second response message indicates that the second access network device accepts or refuses to join the radio network area.

Specifically, if the second access network device accepts to join the radio network area, it indicates that all cells of the second access network device join the radio network area, or if the second access network device refuses to join the radio network area, it indicates that no cell of the second access network device joins the radio network area.

Optionally, in step 203, the first access network device receives a response message that is of the first message and that is sent by the second access network device.

The response message of the first message may be the first response message or the second response message.

Optionally, when the first access network device receives the first response message that is of the first message and that is sent by the second access network device, the first access network device determines a first cell set based on the second cell set.

The first cell set includes the second cell set. Optionally, the first cell set may include at least one second cell set and one or more cells of the first access network device. In this case, the first cell set forms the radio network area of the terminal in the RRC inactive state. Optionally, the first cell set may include only at least one second cell set. In this case, the first cell set and one or more cells of the first access network device form the radio network area.

Optionally, when the first access network device receives the second response message that is of the first message and that is sent by the second access network device, the first access network device determines a first access network device set based on the second response message.

The first access network device set includes at least one second access network device that accepts to join the radio network area. Optionally, the first access network device set may include at least one second access network device and the first access network device. In this case, the first access network device set forms the radio network area. Optionally, the first access network device set may include only at least one second access network device. In this case, the first access network device set and the first access network device form the radio network area.

204. The first access network device sends a second message to the terminal, where the second message is used to instruct the terminal to enter the RRC inactive state.

The terminal receives the second message sent by the first access network device, and enters the RRC inactive state from an RRC connected state based on the second message.

Optionally, when the terminal enters the RRC inactive state, the terminal remains in a serving cell in which the terminal is located when the terminal is in the original RRC connected state. Further, if the terminal has a plurality of serving cells, the terminal camps on one of the serving cells, or the terminal camps on a serving cell from which the terminal receives the second message. That is, when the terminal enters the RRC inactive state, the terminal does not perform cell selection, but remains in a serving cell in which the terminal is located when the terminal is in the original RRC connected state. Subsequently, for example, after the terminal moves, the terminal changes to another cell through a cell reselection process, so that the terminal can enter the RRC inactive state faster, and behavior of the terminal is more controllable. It should be noted that when the terminal enters the RRC inactive state, the solution in which the terminal remains in the serving cell in which the terminal is located when the terminal is in the original RRC connected state may alternatively be implemented separately, that is, may be implemented as an independent embodiment without depending on another embodiment in this specification.

Optionally, the second message may be RRC signaling, but this is not limited in this embodiment of this application.

It should be understood that the access network device may include a central unit (CU) and a distributed unit (DU). A message, such as RRC signaling, sent by the access network device to the terminal may be generated by the CU and sent by the DU to the terminal, or may be generated and directly sent by the DU to the terminal.

Optionally, the second message includes information about the radio network area of the terminal in the RRC inactive state. To be specific, when instructing the terminal to enter the RRC inactive state, the first access network device also notifies the radio network area of the terminal. The information about the radio network area may be a cell list of the radio network area, or may be an access network device list of the radio network area.

The radio network area does not notify the network when the terminal reselects a cell in the radio network area in the RRC inactive state, or the radio network area notifies the network when the terminal reselects a cell outside the radio network area.

Optionally, in an embodiment of this application, the radio network area includes the foregoing first cell set.

In this embodiment, the first access network device sends the cell list of the radio network area to the terminal. As described above, the first cell set may include a cell of the first access network device, or may not include a cell of the first access network device. When the first cell set does not include the cell of the first access network device, the radio network area includes the cell of the first access network device by default, that is, the terminal uses the first cell set and the cell of the first access network device (for example, all cells of the first access network device, or a primary cell, or a cell from which the second message is received) as the radio network area.

Optionally, in another embodiment of this application, the radio network area includes the foregoing first access network device set.

In this embodiment, the first access network device sends the access network device list of the radio network area to the terminal. All cells corresponds to each access network device in the list are included in the radio network area. As described above, the first access network device set may include the first access network device, or may not include the first access network device. When the first access network device set does not include the first access network device, the radio network area includes the first access network device by default, that is, the terminal uses the first access network device set and the first access network device as the radio network area.

Optionally, the first access network device saves the foregoing first cell set or the first access network device set, that is, saves the cell list or the access network device list of the radio network area.

Optionally, the second message may further include a signal strength threshold.

When a signal strength of a cell in the radio network area is greater than or not less than the signal strength threshold, the terminal performs cell replacement or cell reselection in the radio network area.

Specifically, the terminal can preferentially perform cell replacement or reselection in the radio network area. For example, when a signal strength of a cell in the cell list or of an access network device in the access network device list of the radio network area is greater than or not less than the signal strength threshold, the terminal preferentially performs cell reselection in these cells. Optionally, the signal strength threshold may be a uniform threshold, or may be a cell-level threshold. For example, a threshold may be configured for some cells.

It should be understood that the terminal may also perform cell replacement based on other information, for example, priority information of a cell. This is not limited in this embodiment of this application. It should be further understood that if no cell in the radio network area meets a replacement condition, and a cell outside the radio network area meets the replacement condition, the terminal may also be switched to the cell outside the radio network area.

Optionally, the second message may further include second validity period information, and the second validity period information indicates a validity period during which the terminal can be restored to the RRC connected state.

The validity period is a period of time during which the terminal can perform restoration or a validity period during which the context of the terminal is saved. After the validity period, the terminal can no longer be restored, or needs to delete the saved context and enter an idle state. When the terminal needs to enter a connected state, the terminal can initiate an initial access and enter the connected state in a manner of initiating the initial access. Optionally, the validity period is generally achieved by a timer. After receiving the second message that includes the second validity period, the terminal starts the timer and determines the validity period by determining whether the timer expires.

Optionally, the second message may further include a random value and/or an NCC used for generating a key.

Specifically, if the new key is generated based on the random value, the second message carries the random value used for deriving the new key. If the first access network device derives the new key based on the NH (not based on the key used between the first access network device and the terminal), the second message carries the NCC, so that the terminal can derive the new key earlier based on the random value and/or the NCC, and can send data that uses the new key for security protection during restoration of the terminal to the connected state, thereby reducing a data delay. It should be noted that the solution may also be used as an independent embodiment without depending on another embodiment in this specification.

In this embodiment of this application, when determining that the terminal needs to enter the RRC inactive state, the first access network device sends the context of the terminal to the second access network device. In this way, when the terminal requests, of the second access network device, to be restored to the RRC inactive state, the second access network device no longer needs to obtain the context of the terminal from the first access network device, so that time for restoring the terminal from the RRC inactive state to the RRC connected state can be reduced, and then a data transmission delay can be reduced.

It should be understood that the information included in various messages in this embodiment of this application may be sent in one message, or may be separately sent in a plurality of messages. This is not limited in this embodiment of this application.

In the embodiment shown in FIG. 2, the first access network device first sends the context of the terminal to the second access network device, and then instructs the terminal to enter the RRC inactive state. In this way, the first access network device may determine the radio network area of the terminal based on the response message of the second access network device. In this case, a cell included in the determined radio network area is a cell accepted by the second access network device, thereby reducing a probability that the terminal fails to be restored. Optionally, in another embodiment of this application, the first access network device may first instruct the terminal to enter the RRC inactive state, and then send the context of the terminal to the second access network device. In this case, the first access network device may determine the radio network area of the terminal by itself. The following describes this embodiment with reference to FIG. 3.

Figure 3:
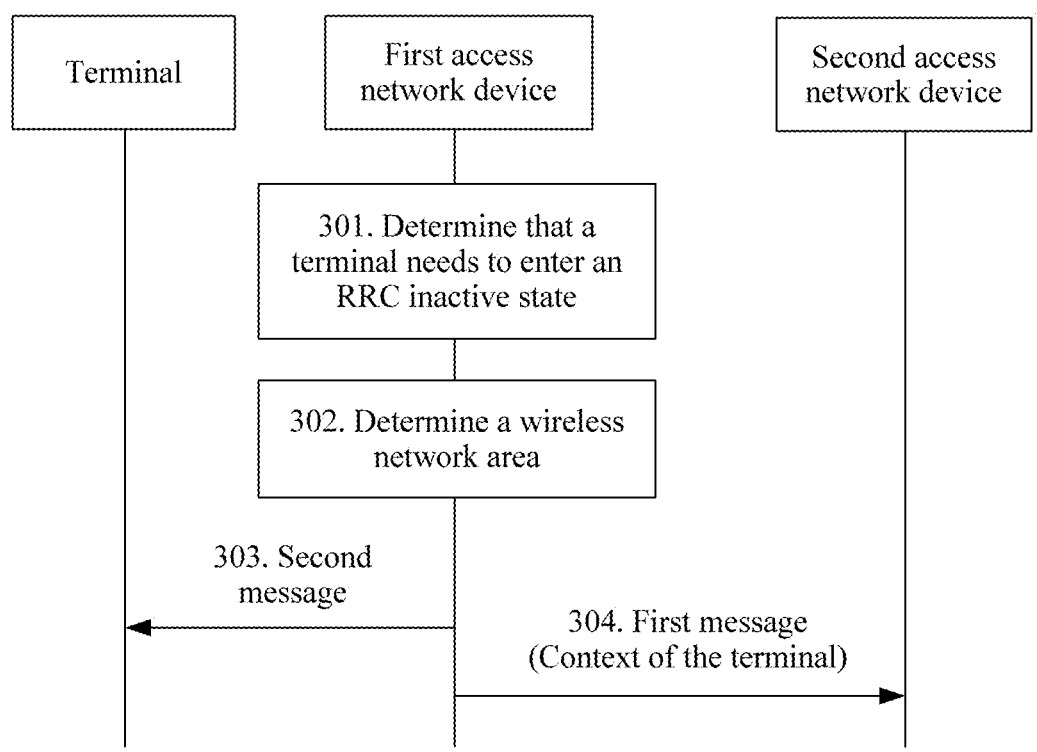
FIG. 3 is a schematic flowchart of a communication method according to another embodiment of this application.

FIG. 3 is a schematic flowchart of a communication method according to another embodiment of this application. In addition to the following description, for other descriptions of the embodiment shown in FIG. 3, refer to the embodiment shown in FIG. 2. For brevity, details are not described below again.

301. A first access network device determines that a terminal needs to enter an RRC inactive state.

Optionally, in step 302, the first access network device determines a radio network area of the terminal in the RRC inactive state.

In this embodiment, the first access network device may determine the radio network area by itself. Similar to the foregoing embodiment, the first access network device may determine a cell list or an access network device list of the radio network area. Different from the foregoing embodiment, the cell list or the access network device list does not need to be determined based on a response message of a second access network device, but may be determined by the first access network device itself. For example, the first access network device may determine the radio network area based on information such as network deployment, a network status, or an activity status of the terminal.

303. The first access network device sends a second message to the terminal, where the second message is used to instruct the terminal to enter the RRC inactive state.

Optionally, the second message may include the radio network area determined in step 302.

304. The first access network device sends a first message to a second access network device, where the first message includes a context of the terminal, and the context of the terminal is used by the terminal to restore from the RRC inactive state to an RRC connected state.

Different from the foregoing embodiment, in this embodiment, the second access network device cannot refuse to join the radio network area.

After the terminal enters the RRC inactive state from the RRC connected state, if the terminal subsequently needs to be restored to the RRC connected state, for example, the terminal needs to send uplink data, or a network pages the terminal, the terminal and an access network device may quickly restore the terminal to the RRC connected state based on the saved context of the terminal. The following describes a restoration procedure with reference to FIG. 4 and FIG. 5.

Figure 4:
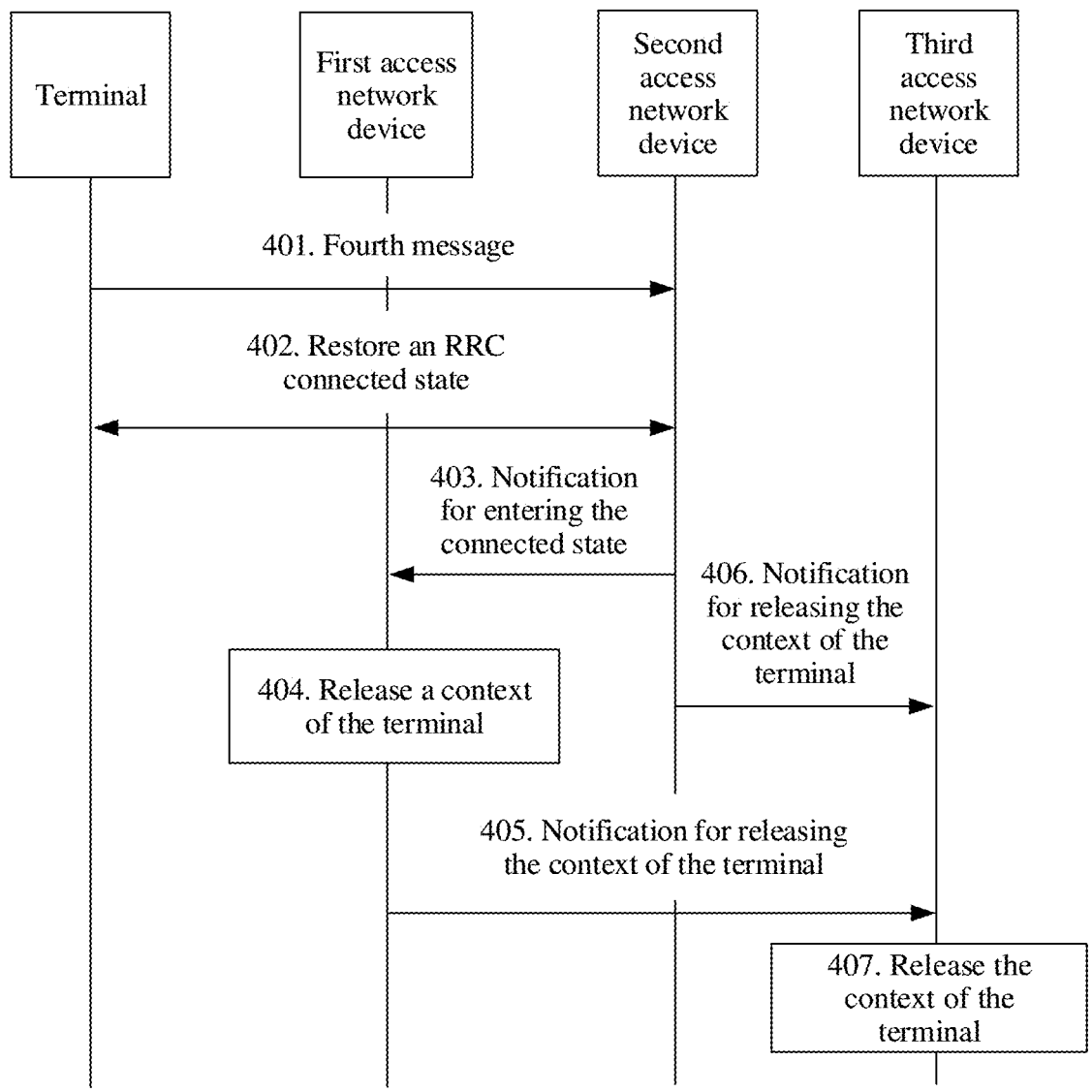
FIG. 4 is a schematic flowchart of a communication method according to still another embodiment of this application.

FIG. 4 is a schematic flowchart of a communication method according to still another embodiment of this application.

In this embodiment, a terminal is restored from an RRC inactive state to an RRC connected state of a second access network device. A first access network device in FIG. 4 is an original serving access network device of the terminal, and a third access network device indicates another access network device in access network devices corresponding to a radio network area of the terminal.

It should be understood that if the terminal is still restored in the original serving access network device, the second access network device in this embodiment is the first access network device, and correspondingly, an interaction procedure between the second access network device and the first access network device is not required. In addition, if access network devices corresponding to the radio network area include only the first access network device and the second access network device, the third access network device is not required.

401. The second access network device receives a fourth message sent by the terminal.

The fourth message is used to request restoration from the RRC inactive state to the RRC connected state. For example, the fourth message may be a restoration request. If the terminal in the RRC inactive state needs to be restored to the RRC connected state, for example, the terminal needs to send uplink data, or a network pages the terminal, the terminal sends the fourth message to an access network device of a cell in which the terminal is currently located, that is, the second access network device, to request to be restored to the RRC connected state. The fourth message may carry an identifier of the terminal.

402. The second access network device restores the terminal from the RRC inactive state to the RRC connected state based on a context of the terminal.

After receiving the fourth message sent by the terminal, the second access network device may search the second access network device for the context of the terminal based on the identifier of the terminal. Because the second access network device has obtained the context of the terminal in advance, the second access network device may directly restore the terminal from the RRC inactive state to the RRC connected state based on the context of the terminal. In addition, the second access network device switches a connection (for example, an $S_1$ connection) between an access network corresponding to the terminal and a core network, that is, switches an access network end of the connection from the first access network device to the second access network device. Then, the terminal performs corresponding data transmission with the second access network device.

The second access network device sends, to a first access network device, a notification that indicates that the terminal enters the connected state.

After the terminal enters the connected state, the second access network device may send, to the first access network device, the notification that indicates that the terminal enters the connected state, so that the first access network device releases the context of the terminal.

404. The first access network device releases the context of the terminal.

When receiving the notification message indicating that the terminal enters the connected state, the first access network device determines that the terminal has been restored to the connected state, and therefore releases the context of the terminal.

405. The first access network device sends, to a third access network device, a notification for releasing the context of the terminal.

Because the terminal has been restored to the connected state, the original context of the terminal and the radio network area are no longer valid, and the first access network device sends, to another access network device in the radio network area, the notification for releasing the context of the terminal, so that the another access network device also releases the context of the terminal.

Optionally, if the second access network device has an access network device list corresponding to the radio network area, for example, the list may be carried in the foregoing first message and sent to the second access network device, step 405 may be replaced by the following step 406.

406. The second access network device sends, to a third access network device, a notification for releasing the context of the terminal.

407. The third access network device releases the context of the terminal.

Optionally, if the terminal requests, of the first access network device, to be restored from the RRC inactive state to the RRC connected state, the first access network device may directly restore the terminal from the RRC inactive state to the RRC connected state based on the context of the terminal. In addition, the first access network device sends, to the another access network device in the radio network area of the terminal, the notification for releasing the context of the terminal, so that the another access network device also releases the context of the terminal.

Optionally, each access network device may set a timer based on a validity period of the context of the terminal. Before the timer expires, if no restoration request of the terminal is received, or no notification that indicates that the terminal enters the connected state, that is sent by the another access network device is received, or no notification that is used for releasing the context of the terminal, that is sent by the another access network device is received, the context of the terminal is released when the timer expires.

For example, the first access network device may start a timer after sending the foregoing second message to the terminal, and the second access network device may start a timer after saving the context of the terminal. Optionally, when paging the terminal, the first access network device may start a timer after sending a paging message for paging the terminal.

Figure 5:
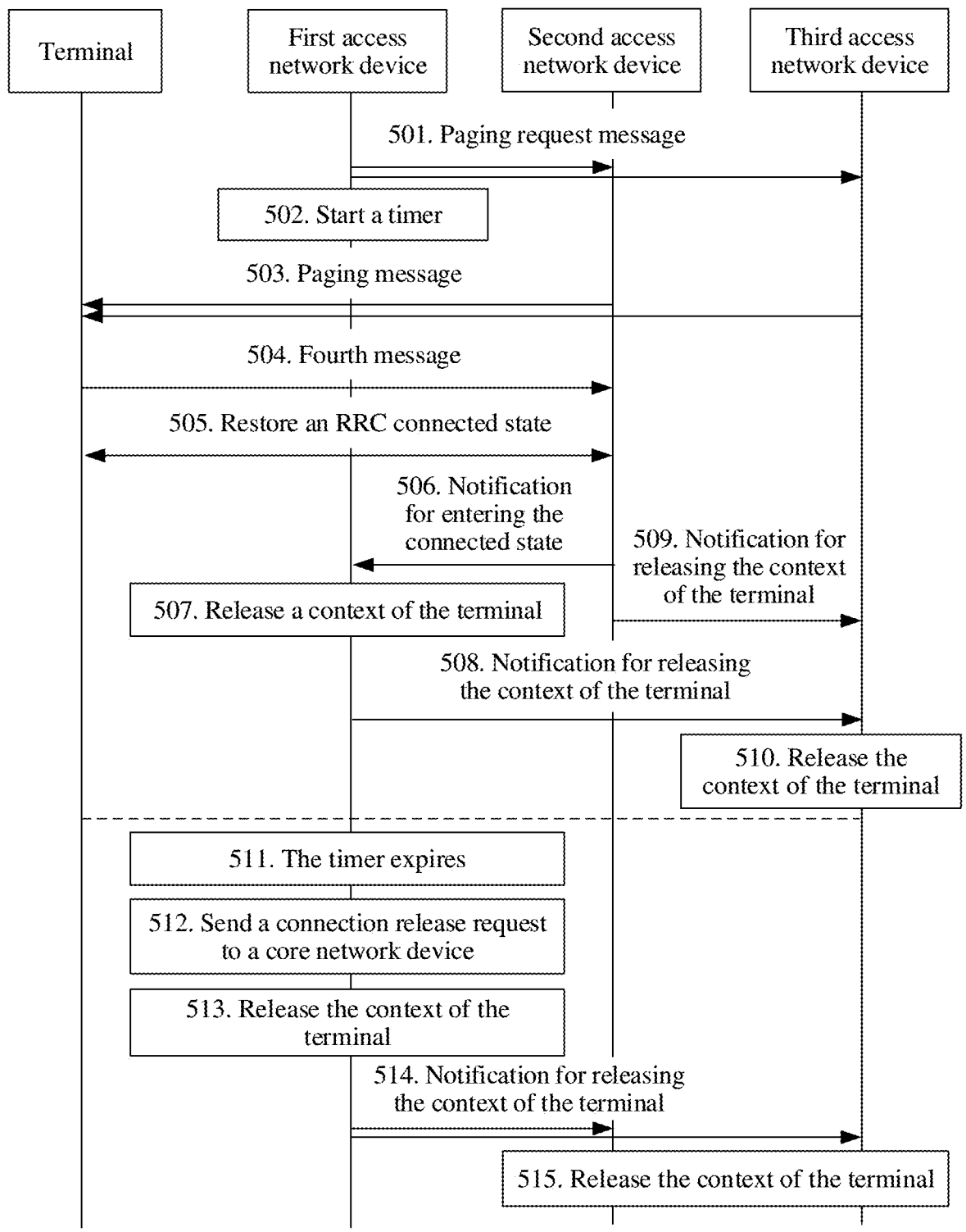
FIG. 5 is a schematic flowchart of a communication method according to still another embodiment of this application.

FIG. 5 is a schematic flowchart of a communication method according to still another embodiment of this application. This embodiment is a procedure when a terminal is paged, and is a specific case of the embodiment shown in FIG. 4. In addition to the following description, for other descriptions of the embodiment shown in FIG. 5, refer to the embodiment shown in FIG. 4. For brevity, details are not described below again.

501. A first access network device sends a paging request message for requesting to page a terminal to a second access network device and a third access network device.

When a terminal in an RRC inactive state needs to be paged, the first access network device sends the paging request message to other access network devices in a radio network area of the terminal in the RRC inactive state, that is, the second access network device and the third access network device in FIG. 5.

It should be understood that if access network devices corresponding to the radio network area include only the first access network device and the second access network device, the third access network device is not required.

Optionally, the paging request message may include information about a cell that is of each access network device and that is corresponding to the radio network area, for example, information about a fourth cell set of the access network device, and is used to instruct the access network device to send, in all cells in the fourth cell set, a paging message for paging the terminal.

In addition, the first access network device sends, in a cell that is of the first access network device and that is corresponding to the radio network area, a paging message for paging the terminal.

Optionally, in step 502, the first access network device starts a timer.

503. The second access network device and the third access network device send a paging message for paging the terminal.

After receiving the paging request message that is used for requesting to page the terminal and that is sent by the first access network device, the second access network device and the third access network device send, based on the paging request message, the paging message for paging the terminal.

Optionally, if a cell list that is of the access network device and that is corresponding to the radio network area is stored at each access network device, the paging message may be sent only in a cell in the cell list based on the cell list, so as to implement more accurate paging and save air interface resources.

Optionally, if the paging request message includes the cell list, the paging message may be sent only in a cell in the cell list based on the cell list included in the paging request message, so as to implement more accurate paging and save air interface resources.

Optionally, if the terminal is currently located in a cell of the second access network device, the following procedure is performed.

504. The second access network device receives a fourth message sent by the terminal.

If the terminal is currently located in the cell of the second access network device, after receiving the paging message, the terminal sends the fourth message to the second access network device. Subsequent steps 505 to 510 are similar to steps 402 to 407 in FIG. 4, and are not described again. In addition, optionally, after determining that the terminal has been restored to a connected state, the first access network device may stop the timer.

Optionally, for a paging failure, perform the following procedure.

511. The timer of the first access network device expires.

To be specific, the first access network device does not receive, within a predetermined period of time, a paging response sent by the terminal or a notification that indicates that the terminal enters a connected state and that is sent by another access network device.

512. The first access network device sends a third message to a core network device.

The third message may be a connection release request or a notification message, and is used to request or instruct the core network device to release a connection (for example, an $S_1$ connection) between the access network and the core network of the terminal. Optionally, a carried cause value may be a radio access network paging failure.

After the connection is released, subsequently (if necessary) the core network may trigger paging for paging the terminal in a wider range to help page the terminal.

It should be understood that the foregoing solution of sending the third message by the first access network device in the case of a paging failure may be implemented separately. That is, the solution can be independent of other features. For example, all procedures before the paging failure may be implemented by using the solutions provided in this embodiment of this application, or may be implemented by using another solution. When the paging failure occurs, the third message is sent to the core network device to request or instruct the core network device to release the connection between the access network of the terminal and the core network. After releasing the connection, the core network device may page the terminal in a wider range, for example, in a tracking area of the terminal.

After releasing the connection, the core network device may send a response message of the third message to the first access network device, where the response message of the third message indicates that the connection between the access network of the terminal and the core network has been released.

513. The first access network device releases the context of the terminal.

514. The first access network device sends, to the second access network device and the third access network device, a notification for releasing the context of the terminal.

515. The second access network device and the third access network device release the context of the terminal.

After the paging fails or the terminal enters the connected state, a load of an access network device can be reduced by releasing the context of the terminal on a timely basis.

It should be noted that the cell set information mentioned in the embodiments of this application may be a set including at least one cell identity, or may be an identifier of a cell set, and there is a mapping relationship between the identifier of the cell set and a cell in the set. This is not limited in this embodiment of this application.

It should be understood that sequence numbers of the foregoing processes do not mean execution sequences in various embodiments of this application. The execution sequences of the processes should be determined according to functions and internal logic of the processes, and should not constitute any limitation on the implementation processes of the embodiments of this application.

It should be understood that the various embodiments described in this specification may be implemented in combination or separately.

It should be understood that specific examples in the embodiments of this application are merely intended to help a person skilled in the art better understand the embodiments of this application, but are not intended to limit the scope of the embodiments of this application.

The foregoing has described in detail the communication method in the embodiments of this application. The following describes an access network device and a terminal in the embodiments of this application. It should be understood that the access network device and the terminal in the embodiments of this application may perform various methods in the foregoing embodiments of this application that is, for a detailed working process of the following devices, refer to a corresponding process in the foregoing method embodiments.

Figure 6:
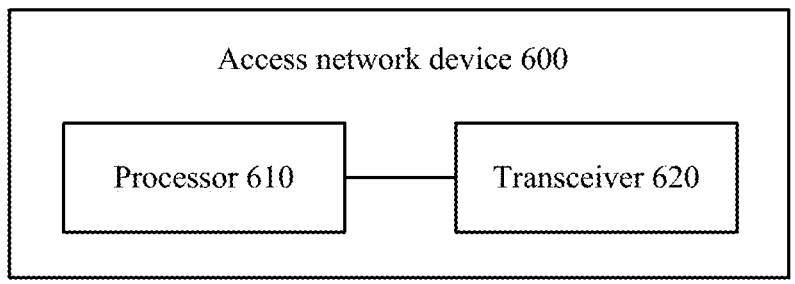
FIG. 6 is a schematic block diagram of an access network device according to an embodiment of this application.

FIG. 6 is a schematic block diagram of an access network device 600 according to an embodiment of this application. The access network device 600 may be an access network device in the foregoing method embodiments, for example, the first access network device. As shown in FIG. 6, the access network device 600 includes a processor 610, configured to determine that a terminal needs to enter a Radio Resource Control RRC inactive state, where the access network device is a serving access network device of the terminal, and a transceiver 620, configured to send a first message to a second access network device, where the first message includes a context of the terminal, and send a second message to the terminal, where the second message is used to instruct the terminal to enter the RRC inactive state.

Optionally, the second message includes information about a radio network area of the terminal in the RRC inactive state.

The radio network area is used not to notify the network when the terminal reselects a cell in the radio network area in the RRC inactive state, or the radio network area is used to notify the network when the terminal reselects a cell outside the radio network area.

Optionally, the radio network area includes a first cell set.

The transceiver 620 is further configured to receive a first response message that is of the first message and that is sent by the second access network device, where the first response message includes information about a second cell set, and the second cell set is a set including one or more cells that are of the second access network device.

The processor 610 is further configured to determine the first cell set based on the second cell set, where the first cell set includes the second cell set.

Optionally, the radio network area includes a first access network device set.

The transceiver 620 is further configured to receive a second response message that is of the first message and that is sent by the second access network device, where the second response message indicates that the second access network device accepts or refuses to join the radio network area.

The processor 610 is further configured to determine the first access network device set based on the second response message, where the first access network device set includes at least one second access network device that accepts to join the radio network area.

Optionally, the transceiver 620 is further configured to receive a notification message indicating that the terminal enters a connected state.

The processor 610 is further configured to release the context of the terminal.

The transceiver 620 is further configured to send, a notification for releasing the context of the terminal, to an access network device other than the access network device in access network devices corresponding to the radio network area of the terminal in the RRC inactive state.

Optionally, the transceiver 620 is further configured to when the terminal in the RRC inactive state needs to be paged, send in a cell that is of the access network device and that is corresponding to the radio network area of the terminal in the RRC inactive state, a first paging message for paging the terminal, and send a paging request message for requesting to page the terminal to a third access network device, where the third access network device is an access network device other than the access network device in access network devices corresponding to the radio network area.

The access network device 600 in this embodiment of this application may be corresponding to the first access network device in the communication methods in the embodiments of this application, and the foregoing and other operations and/or functions of modules in the access network device 600 are separately used to implement corresponding procedures of the methods. For brevity, details are not described herein again.

Figure 7:
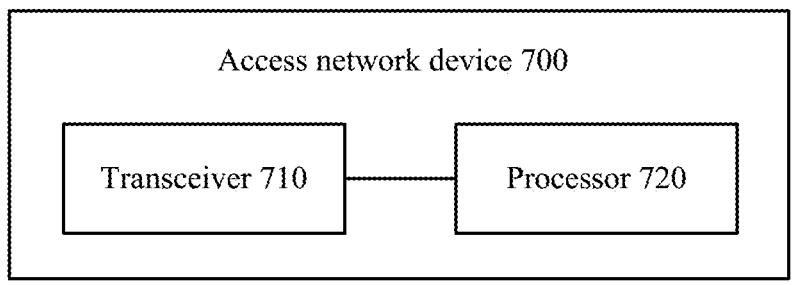
FIG. 7 is a schematic block diagram of an access network device according to another embodiment of this application.

FIG. 7 is a schematic block diagram of an access network device 700 according to an embodiment of this application. The access network device 700 may be an access network device in the foregoing method embodiments, for example, the second access network device. As shown in FIG. 7, the access network device 700 includes a transceiver 710, configured to receive a first message sent by a first access network device, where the first message includes a context of a terminal, and the first access network device is a serving access network device of the terminal, and receive a fourth message sent by the terminal, where the fourth message is used to request restoration from a Radio Resource Control RRC inactive state to an RRC connected state, and a processor 720, configured to restore the terminal from the RRC inactive state to the RRC connected state based on the context of the terminal.

Optionally, the processor 720 is further configured to determine a second cell set, where the second cell set is a set of cells that are accepted by the access network device, that are corresponding to a radio network area of the terminal in the RRC inactive state, and that are of the access network device.

The transceiver 710 is further configured to send a first response message of the first message to the first access network device, where the first response message includes the second cell set.

The access network device 700 in this embodiment of this application may be corresponding to the second access network device in the communication methods in the embodiments of this application, and the foregoing and other operations and/or functions of modules in the access network device 700 are separately used to implement corresponding procedures of the methods. For brevity, details are not described herein again.

Figure 8:
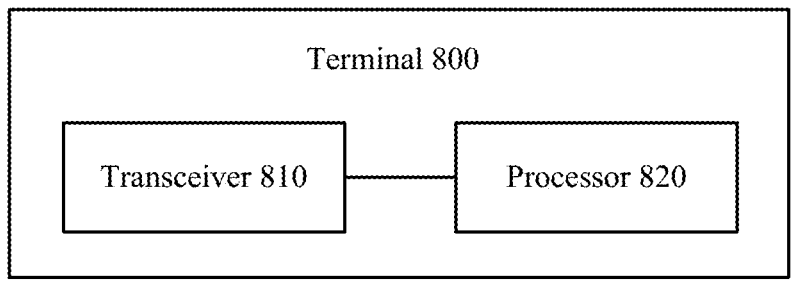
FIG. 8 is a schematic block diagram of a terminal according to an embodiment of this application.

FIG. 8 is a schematic block diagram of a terminal 800 according to an embodiment of this application. The terminal 800 may be the terminal in the foregoing method embodiments. As shown in FIG. 8, the terminal 800 includes a transceiver 810, configured to receive a second message sent by a first access network device, where the second message is used to instruct the terminal to enter a Radio Resource Control RRC inactive state, the second message includes a radio network area of the terminal in the RRC inactive state, the first access network device is a serving access network device of the terminal, the radio network area includes a second access network device or a cell of the second access network device, the second access network device is an access network device that receives a context of the terminal, and the context of the terminal is used by the terminal to restore from the RRC inactive state to an RRC connected state, and a processor 820, configured to enter the RRC inactive state from the RRC connected state based on the second message.

Optionally, the second message further includes a signal strength threshold.

The processor 820 is further configured to when a signal strength of a cell in the radio network area is greater than or not less than the signal strength threshold, perform cell replacement in the radio network area.

Optionally, the processor 820 is configured to when the terminal enters the RRC inactive state, remain in a cell in which the terminal is located when the terminal is in the original RRC connected state.

Optionally, the transceiver 810 is further configured to send a fourth message to the second access network device, where the fourth message is used to request restoration from the RRC inactive state to the RRC connected state.

The processor 820 is further configured to restore, based on the context of the terminal, the terminal from the RRC inactive state to the RRC connected state in a cell of the second access network device.

The terminal 800 in this embodiment of this application may be corresponding to the terminal in the communication methods in the embodiments of this application, and the foregoing and other operations and/or functions of the modules in the terminal 800 are separately used to implement corresponding procedures of the methods. For brevity, details are not described herein again.

Figure 9:
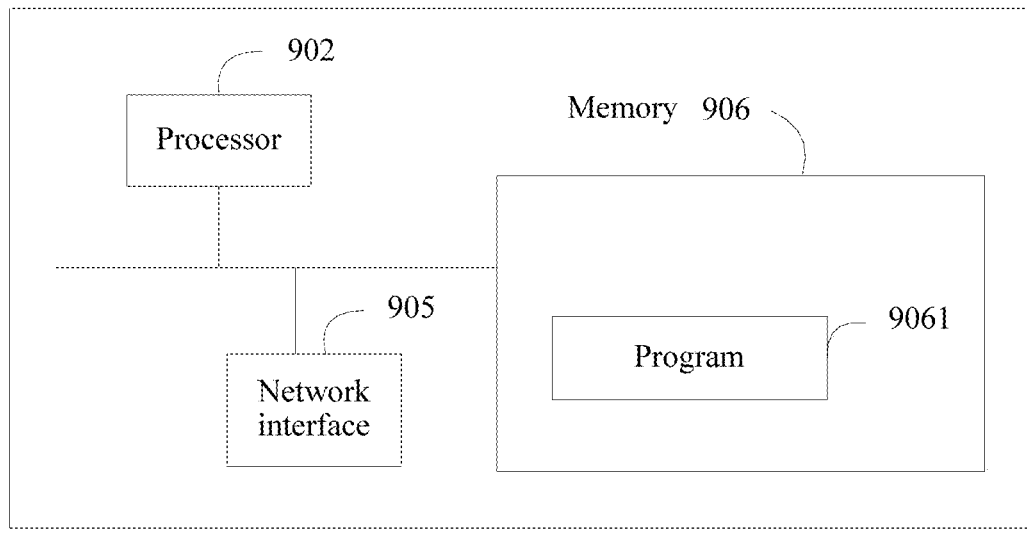
FIG. 9 is a schematic structural diagram of an access network device according to still another embodiment of this application.

FIG. 9 shows a structure of an access network device according to still another embodiment of this application, including at least one processor 902 (for example, a CPU), at least one network interface 905 or another communications interface, and a memory 906. These components are in communication connection with each other. The processor 902 is configured to execute an executable module, such as a computer program, stored in the memory 906. The memory 906 may include a high-speed random access memory (RAM), or may further include a non-volatile memory, for example, at least one magnetic disk memory. A communication connection between the memory 906 and at least one other network element is implemented by using the at least one network interface 905 (which may be wired or wireless).

In some implementations, the memory 906 stores a program 9061, and the processor 902 executes the program 9061 to perform the methods in the foregoing embodiments of this application.

Figure 10:
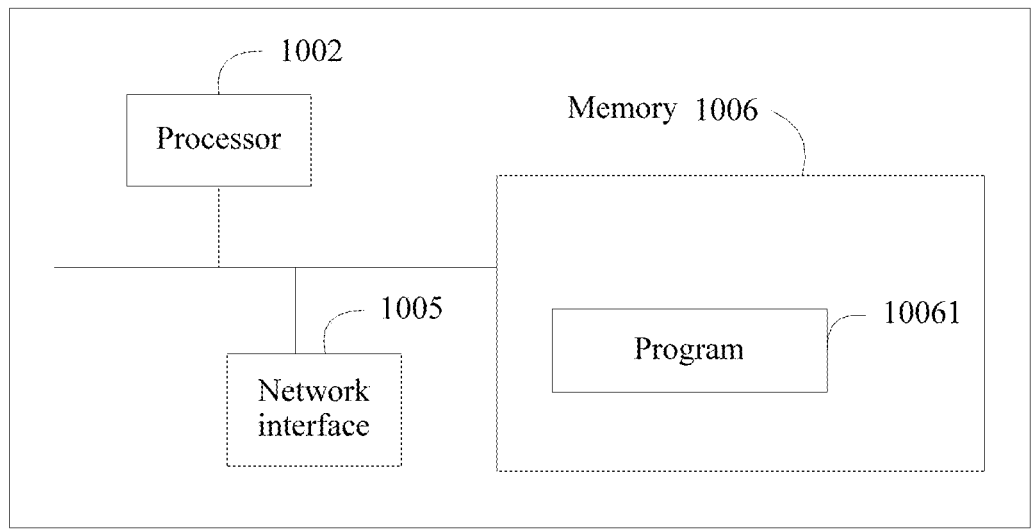
FIG. 10 is a schematic structural diagram of a terminal according to another embodiment of this application.

FIG. 10 shows a structure of a terminal according to still another embodiment of this application, including at least one processor 1002 (for example, a CPU), at least one network interface 1005 or another communications interface, and a memory 1006. These components are in communication connection with each other. The processor 1002 is configured to execute an executable module, such as a computer program, stored in the memory 1006. The memory 1006 may include a high-speed random access memory (RAM), or may further include a non-volatile memory, for example, at least one magnetic disk memory. A communication connection between the memory 1006 and at least one other network element is implemented by using the at least one network interface 1005 (which may be wired or wireless).

In some implementations, the memory 1006 stores a program 10061, and the processor 1002 executes the program 10061 to perform the methods in the foregoing embodiments of this application.

It should be understood that the term "and/or" in the embodiments of this application describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
sending, by a first access network device, in a cell that is of the first access network device and that corresponds to a radio network area of a terminal in a radio resource control (RRC) inactive state, and in response to the terminal in the RRC inactive state needing to be paged, a first paging message paging the terminal;
sending, by the first access network device to a second access network device, a paging request message requesting that the second access network device page the terminal, wherein the second access network device corresponds to the radio network area; and
sending, by the first access network device, a message to a core network device in response to the first access network device not receiving, within a predetermined period of time, a paging response from the terminal or a notification that is from the second access network device and that indicates that the terminal enters a connected state, wherein the message to the core network device requests that the core network device release a connection between the first access network device and the core network device of the terminal.

2. The method according to claim 1, wherein the paging request message comprises information about a cell set, and instructs the second access network device to send, in cells in the cell set, a second paging message paging the terminal, wherein the cell set is a set of cells of the radio network area and that are of the second access network device.

3. The method according to claim 1, wherein the method further comprises:
receiving, by the first access network device, a response message corresponding to the message to the core network device from the core network device, wherein the response message indicates that the connection between the first access network device of the terminal and the core network device has been released;
releasing, by the first access network device, a context of the terminal.

4. The method according to claim 1, wherein the message to the core network device comprises a cause value, wherein the cause value indicates a radio access network paging failure.

5. The method according to claim 1, wherein the paging request message requesting to page the terminal causes the second access network device to page the terminal, wherein the second network access device paging the terminal causes the second network access device to restore the terminal to an RRC connected state with the second network access device according to a context of the terminal saved at the second network access device.

6. The method according to claim 5, further comprising sending, by the first network access device, a context message to the second access network device, wherein the context message includes a context of the terminal and causes the second network access device to store the context of the terminal.

7. The method according to claim 1, wherein the paging message identifies one or more cells in which the second access network device pages the terminal.

8. A communication method, comprising:
receiving, by a core network device, from a first access network device, a message sent in response to the first access network device not receiving, within a predetermined period of time, a paging response from a terminal or a notification that is from a second access network device and that indicates that the terminal enters a connected state, wherein the message requests that the core network device release a connection between the first access network device and the core network device of the terminal, and wherein the second access network device is an access network device that has received, prior to the second access network device sending the notification, a paging request message requesting that the second access network device page the terminal from the first access network device; and
sending a response message corresponding to the message to the first access network device, wherein the response message indicates that the connection between the first access network device of the terminal and the core network device has been released.

9. The method according to claim 8, wherein the paging request message comprises information about a cell set, and instructs the second access network device to send, in cells in the cell set, a second paging message for paging the terminal, wherein the cell set is a set of cells of a radio network area and that are of the second access network device.

10. The method according to claim 8, wherein the message comprises a cause value, wherein the cause value indicates a radio access network paging failure.

11. A core network device, comprising:
a processor; and
a non-transitory computer-readable storage medium storing a program to be executed by the processor, the program including instructions to:
receive from a first access network device, a message in sent response to the first access network device not receiving, within a predetermined period of time, a paging response from a terminal or a notification from a second access network device that indicates that the terminal enters a connected state, wherein the message requests that the core network device release a connection between the first access network device and the core network device of the terminal, and wherein the second access network device is an access network device that has received, prior to the second access network device sending the notification, a paging request message requesting that the second access network device page the terminal from the first access network device; and
send a response message corresponding to the message to the first access network device, wherein the response message indicates that the connection between the first access network device of the terminal and the core network device has been released.

12. The core network device according to claim 11, wherein the paging request message comprises information about a cell set, and instructs the second access network device to send, in cells in the cell set, a second paging message for paging the terminal, and wherein the cell set is a set of cells of a radio network area and that are of the second access network device.

13. The core network device according to claim 11, wherein the message comprises a cause value, wherein the cause value indicates a radio access network paging failure.

14. A communication system, comprising:
a first access network device;
a second access network device; and
a core network device;
wherein the first access network device is configured to:
send, in a cell that is of the first access network device and that corresponds to a radio network area of a terminal in a radio resource control (RRC) inactive state, and in response to the terminal in the RRC inactive state needing to be paged, a first paging message paging the terminal;
send, to a second access network device, a paging request message requesting that the second access network device page the terminal, wherein the second access network device corresponds to the radio network area; and
send a message to a core network device in response to the first access network device not receiving, within a predetermined period of time, a paging response from the terminal or a notification that is from the second access network device and that indicates that the terminal enters a connected state from the second access network device, wherein the message to the core network device requests that the core network device release a connection between the first access network device and the core network device of the terminal;

wherein the second access network device is configured to receive the paging request message and page the terminal; and wherein the core network device is configured to:
receive, from the first access network device, the message; and
send a response message corresponding to the message to the first access network device, wherein the response message indicates that the connection between the first access network device of the terminal and the core network device has been released.

15. The system according to claim 14, wherein the paging request message comprises information about a cell set, and instructs the second access network device to send, in cells in the cell set, a second paging message paging the terminal, wherein the cell set is a set of cells of the radio network area and that are of the second access network device.

16. The system according to claim 14, wherein the first access network device is further configured to:
receive the response message from the core network device, wherein the response message indicates that the connection between the first access network device of the terminal and the core network device has been released; and
release a context of the terminal.

17. The system according to claim 14, wherein the message to the core network device comprises a cause value, wherein the cause value indicates a radio access network paging failure.

18. The system according to claim 14, wherein the paging request message requesting to page the terminal causes the second access network device to page the terminal, wherein the second network access device paging the terminal causes the second network access device to restore the terminal to an RRC connected state with the second network access device according to a context of the terminal saved at the second network access device.

19. The system according to claim 18, wherein the first network access device is further configured to send a context message to the second access network device, wherein the context message includes a context of the terminal and causes the second network access device to store the context of the terminal.

20. The system according to claim 14, wherein the first paging message identifies one or more cells in which the second access network device pages the terminal.

* * * * *